United States Patent [19]

Sugita

[11] 4,429,016
[45] Jan. 31, 1984

[54] MAGNETIC RECORDING MEDIUM WITH VACUUM DEPOSITED MAGNETIC LAYER

[75] Inventor: Ryuji Sugita, Hirakata, Japan

[73] Assignee: Matsushita Electric Industrial Co., Ltd., Japan

[21] Appl. No.: 240,368

[22] Filed: Mar. 4, 1981

[30] Foreign Application Priority Data

Mar. 7, 1980 [JP] Japan .................................. 55-29622
Mar. 10, 1980 [JP] Japan .................................. 55-30615
Oct. 16, 1980 [JP] Japan .................................. 55-145166
Nov. 11, 1980 [JP] Japan .................................. 55-159290

[51] Int. Cl.³ .............................................. G11B 5/66
[52] U.S. Cl. .................................. 428/692; 427/131; 428/694; 428/697; 428/900
[58] Field of Search .................... 252/62.55; 477/131; 428/900, 692, 694, 697

[56] References Cited

U.S. PATENT DOCUMENTS 3,775,179 11/1973 Clow .............................. 252/62.53
4,210,946 7/1980 Iwasaki et al. .................... 428/900
4,277,809 7/1981 Fisher .............................. 427/131

OTHER PUBLICATIONS

Iwasaki et al., Co-Cr Recording Films with Perpendicular Magnetic Anisotropy, IEEE Transactions on Magnetics, vol. Mag 14, No. 5, Sep. 1978, pp. 849-851.

*Primary Examiner*—Marion McCamish
*Attorney, Agent, or Firm*—Wenderoth, Lind & Ponack

[57] ABSTRACT

The present invention relates to a magnetic recording medium of the vertical record type belonging to the Co-Cr series in which the residual magnetization is normal to said magnetic medium, characterized by the fact that Cr is present in an amount of 13 to 28% by weight based on the total of Co and Cr and the value of the saturation magnetization of said magnetic medium is larger than that of the bulk having the same composition as the mean value of composition of said magnetic medium.

3 Claims, 11 Drawing Figures

0: BOUNDARY BETWEEN A SUBSTRATE AND A MAGNETIC LAYER
1: SURFACE OF MAGNETIC LAYER

MAGNETIC RECORDING MEDIUM WITH VACUUM DEPOSITED MAGNETIC LAYER

The present invention relates to a magnetic recording medium particularly suitable for a magnetic record of the vertical type having an improved short-wave recording characteristic by directing a residual magnetization in the direction of the normal to a medium.

A magnetic recording medium has been used in which a magnetic film has an easily magnetizable axis parallel to the surface of said magnetic film. In case of recording and playing back signals by means of such a magnetic recording medium, the antimagnetic field is strengthened for shortwave signals and the playback output is remarkably decreased because the residual magnetization is parallel to the surface of said magnetic film. The requirement for a high density recording has recently become remarkably strong in the magnetic recording field. This increasingly produces the requirement for short-wave recording signals. The conventionally known magnetic film having said easily magnetizable axis parallel to the surface thereof can not satisfy the above mentioned requirement on account of the above mentioned reason.

To the end of improving this, a method for recording and playing back (hereinafter referred to as a method for recording of the vertical type), in which a residual magnetization is vertical to the medium, is proposed. This is a method for recording signals on a magnetic recording medium (hereinafter referred to as a recording medium of the vertical type) provided with a thin magnetic film having an easily magnetizable axis in the direction vertical thereto (hereinafter referred to as a magnetizable film of the vertical type) formed thereon by means of a magnetic head of the vertical type consisting of a ferromagnetic thin film containing an exciting coil. According to the method of this type, the residual magnetization of a medium having signals recorded thereon is directed in the direction vertical to said medium and consequently the antimagnetic field is reduced and the playback output is improved as the wavelength of signals becomes shorter.

The main components of the conventionally used magnetizable film of vertical type are Co and Cr. Said magnetizable film of vertical type has been manufactured by sputtering. A sputtered film containing Co. and Cr as its main components shows a compact-hexagonal crystalline construction within the limits of Cr content of about 30 or less % by weight, being able to direct C-axis in the direction vertical to the surface thereof, and being able to reduce the saturation magnetization until a crystallographically anisotropic magnetic field in the vertical direction becomes larger than the antimagnetic field. Thus a magnetizable film of vertical type can be provided.

Although a remarkably higher-density record in comparison with the conventional ones can be realized by using such a magnetizable film of the vertical type, it is a magnetic recording medium of a comparatively new idea and consequently, one having sufficient magnetic characteristics has not yet been proposed. On the other hand, a magnetic recording medium of this type has a great defect that it is apt to be corroded. This is a technical problem to be solved by all means from the viewpoint of practical use.

An object of the present invention is to provide a magnetic recording medium of vertical type having an improved magnetic characteristics and corrosion resistance.

The characteristics of the present invention will be described in detail hereinafter by reference to the attached drawings.

Figure 1:
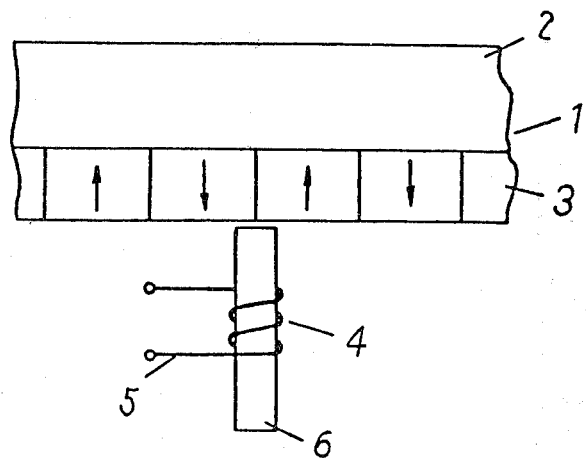
FIG. 1 is a diagram showing the principle of a method for recording and playing back magnetically by means of a magnetic head of vertical type.

Referring now to FIG. 1 showing the principle of a method for recording of vertical type, 1 designates a magnetic recording medium consisting of a thin magnetic film 3 formed on a non-magnetic substrate 2 made of materials such as polyimide and the like. Said thin magnetic film 3 is constructed so as to have an easily magnetizable axis in the direction vertical thereto (in the direction of an arrow shown in FIG. 1). 4 designates a head of the vertical type consisting of a thin ferromagnetic film 6 containing exciting coils 5, said head 4 serving to record signals on said thin magnetic film 3 and play back recorded signals. According to the method of the present invention, the residual magnetization of a medium having signals recorded thereon is directed in the direction vertical to said medium and consequently the antimagnetic field is reduced and the play back output is improved as the wavelength of signals becomes shorter.

Said thin magnetic film 3 has been manufactured by means of sputtering. It is, however, difficult to manufacture a magnetizable film of the vertical type at a low cost because the speed of forming a thin magnetic film is low in said sputtering method.

Contrary to such a sputtering method, according to a vacuum deposition method (including a method such as an ion-plating method in which a part of evaporized atoms is ionized), a magnetizable film of the vertical type can be formed at a rapid rate of several 100 to several 1,000 Å/sec by adjusting manufacturing conditions such as a temperature of the substrate and the like when forming a thin film.

Figure 2:
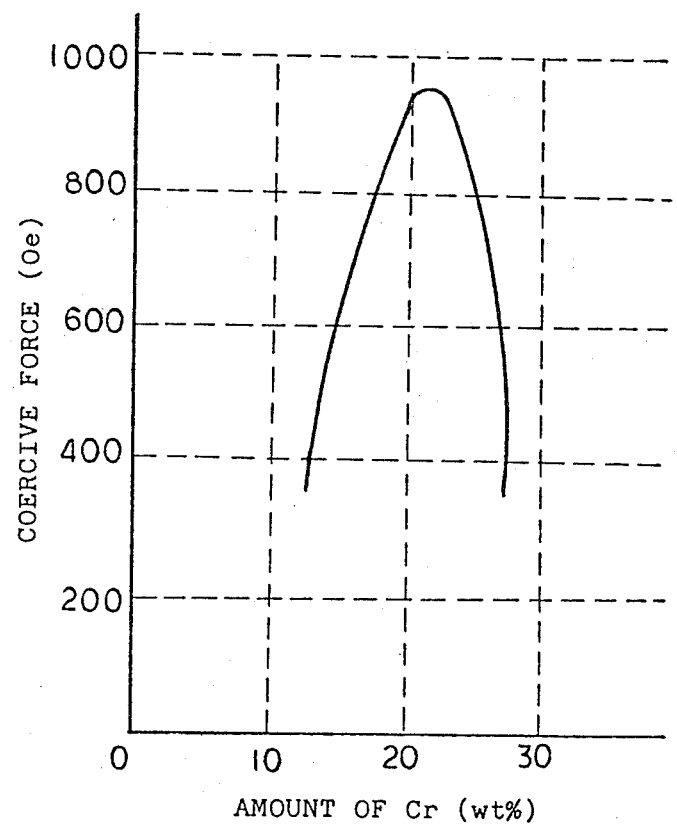
FIG. 2 is a graph showing the relationship between the coercive force in the direction vertical to a thin magnetic film and the ratio of Co/Cr in said thin magnetic film.

FIG. 2 is a graph showing the relationship between the ratio of Co and Cr in a magnetic film formed by means of a vacuum deposition method and a coercive force vertical to said magnetic film. It is found from FIG. 2 that improved magnetic characteristic can be attained within the limits in which Cr is contained in the amount of 13 to 28% by weight based on the total of Co and Cr in said magnetic film. Although the relationship between the coercive force vertical to said thin magnetic film and the ratio of Co and Cr shows almost the same tendency as shown in FIG. 2 when changing manufacturing conditions such as the atmosphere, the speed of forming the film, the temperature of the substrate and the like during vacuum deposition, its value and corrosion resistance are remarkably changed. This is caused by the fact that a saturation magnetization and packing coefficient of said magnetic film are remarkably changed in dependence upon the atmosphere, the speed of forming the film, the temperature of the substrate and the like during vacuum deposition. Therefore, it is possible to impart improved magnetic characteristic and corrosion resistance to said magnetizable film of vertical type by forming said magnetic film, adjusting the atmosphere, the speed of forming a thin film, the temperature of a substrate and the like during vacuum deposition so as to obtain the appointed saturation magnetization and packing coefficient.

Figure 3:
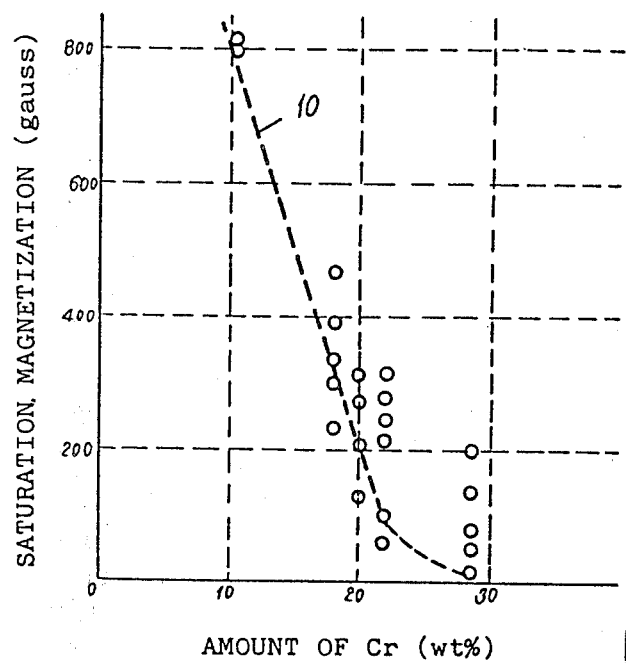
FIG. 3 is a graph showing the relationship between the content of Cr at % by weight in a Co-Cr magnetizable film of vertical type and the saturation magnetization.
Figure 4:
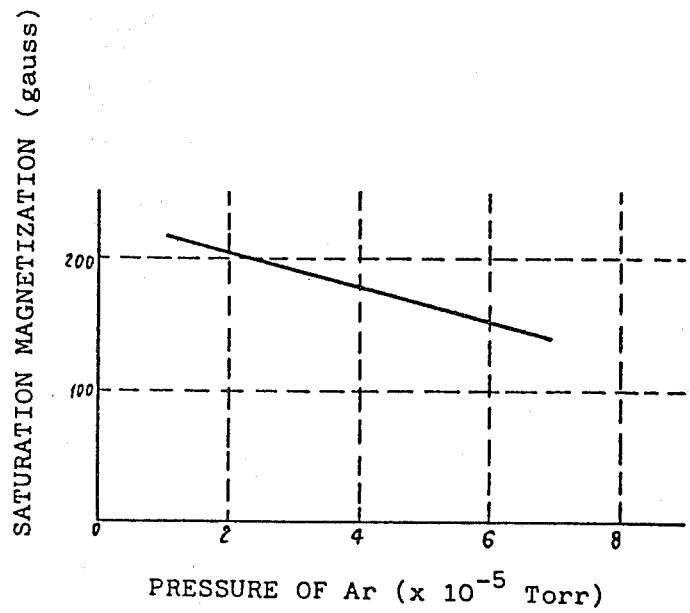
FIG. 4 is a graph showing a relationship between the pressure of Ar during vacuum deposition of a Co-Cr magnetizable film of vertical type and a saturation magnetization.
Figure 5:
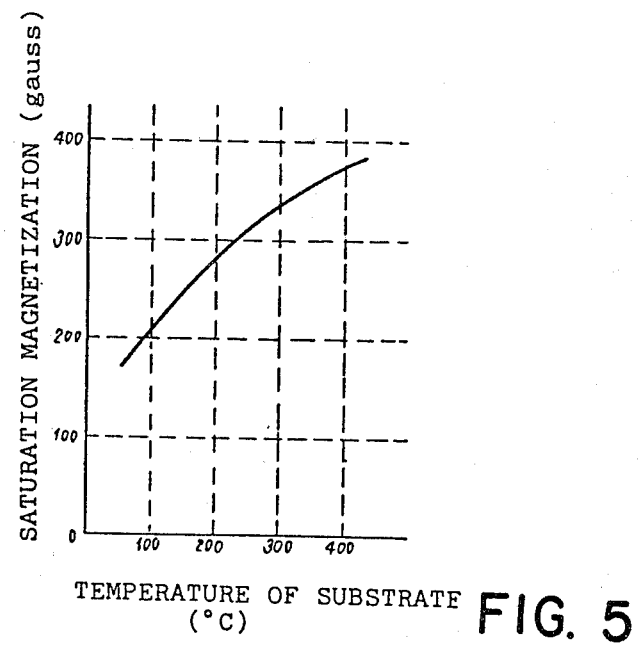
FIG. 5 is a graph showing the relationship between the temperature of a substrate during vacuum deposition of a Co-Cr magnetizable film of the vertical type and a saturation magnetization.

FIG. 3 is a graph showing the relationship between Co content in % by weight of Co-Cr magnetizable film of the vertical type obtained by a vacuum-deposition method and the saturation magnetization. As shown by white circles in FIG. 3, the different values of a saturation magnetization for the same Cr content at % by weight are due to different conditions such as the atmosphere, the speed of forming a thin film, the temperature of the substrate and the like during vacuum deposition. A broken line 10 in FIG. 3 shows the relationship between the Cr content of Co-Cr bulk and the saturation magnetization. Furthermore FIG. 4 is a graph showing the relationship between the pressure of Ar and saturation magnetization for a magnetizable film of the vertical type obtained by using Ar gas with a variety of pressures during vacuum deposition. But the Cr content of said thin film is held constant (20% by weight). Furthermore FIG. 5 is a graph showing the relationship between the saturated magnetization and the temperature of the substrate for Co-Cr magnetizable film of the vertical type manufactured by vacuum deposition at a variety of temperature of the substrate. Also in this case, the Cr content of said thin film is held constant (20% by weight). It is indicated from FIG. 4 that the saturation magnetization of said magnetizable film of the vertical type is reduced as the pressure of Ar gas is increased in spite of the constant composition thereof while it is indicated from FIG. 5 that a saturation magnetization of said magnetizable film of vertical type is increased as the temperature of a substrate is increased in spite of the constant composition thereof.

Figure 6:
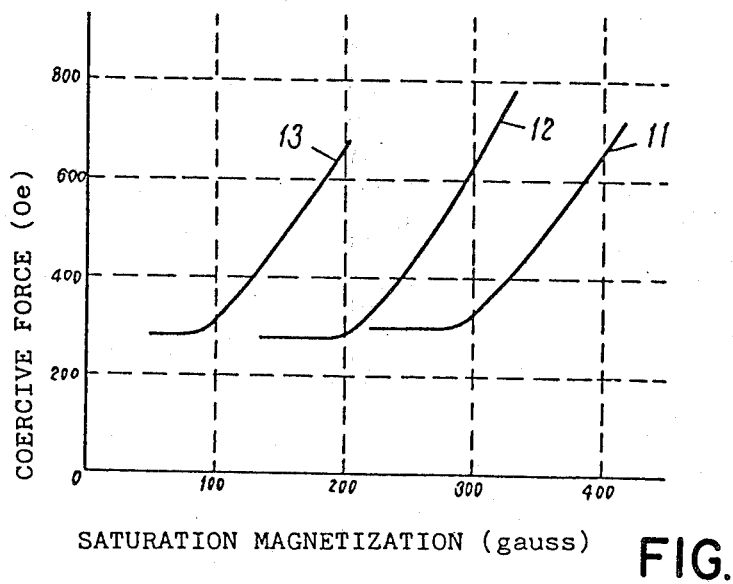
FIG. 6 is a graph showing the relationship between saturated magnetization of a Co-Cr magnetizable film of the vertical type and a coercive force in the direction vertical to a surface of said film.

Then FIG. 6 is a graph showing the relationship between the saturation magnetization and the coercive force vertical to a surface of said film for a Co-Cr magnetizable film of the vertical type obtained by a vacuum deposition method under a variety of manufacturing conditions. But the curve 11, 12 and 13 shows the case in which the Cr content of said thin film is 18, 20 and 22% by weight, respectively. It is clear from FIG. 6 that the coercive force is rapidly increased as the Cr content is increased, that is to say the saturation magnetization of said thin film is about 290 gausses or more, about 200 gausses or more and about 90 gausses or more for the Cr content of 18, 20 and 22% by weight, respectively. A saturation magnetization of 290, 200 and 90 gausses is equal to a saturation magnetization of the Co-Cr bulk containing Cr at the rate of 18, 20 and 22% by weight, respectively. Therefore, a magnetizable film showing a high coercive force can be obtained by increasing the saturation magnetization thereof larger than that of the Co-Cr bulk having the same composition.

Figure 7:
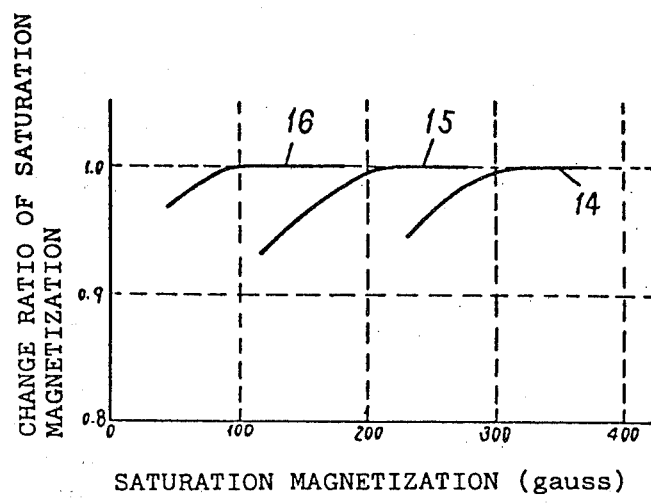
FIG. 7 is a graph showing the relationship between saturated magnetization of a Co-Cr magnetizable film of the vertical type and the change rate of saturation magnetization.

FIG. 7 is a graph showing the relationship between the saturation magnetization and corrosion resistance for a Co-Cr magnetizable film of the vertical type obtained by a vacuum deposition method under a variety of manufacturing conditions. But the corrosion resistance of said thin film is expressed by the ratio of a saturation magnetization thereof ater keeping it for 2 months in an atmosphere having a temperature of 60° C. and a humidity of 90% of that immediately after vacuum deposition. This value is left just as 1 if said thin film is not subjected to corrosion while this value is reduced as corrosion resistance is lowered. The curve 14, 15 and 16 shows the case in which the Cr content of said film is 18, 20 and 22% by weight, respectively. A saturation magnetization is about 290, 200 and 90 or more gausses for the Cr content of 18, 20 and 22% by weight, respectively and the value of the longitudinal axis is remarkably near to 1. It can be found from the above described that said thin film is hardly subjected to corrosion. Therefore also an improved corrosion resistance can be given to said Co-Cr magnetizable thin film by adjusting the Cr content thereof between the limits of 13 to 28% by weight and increasing the saturation magnetization thereof larger than that of the bulk having the same composition.

Relations between packing coefficient x, magnetic characteristics and corrosion resistance of said magnetic thin film will be described below. The packing coefficient x is expressed by the quotient obtained by dividing the density of said magnetizable film (g/cm$^3$) by that of a single crystal (g/cm$^3$) having the same composition as said film.

Figure 8:
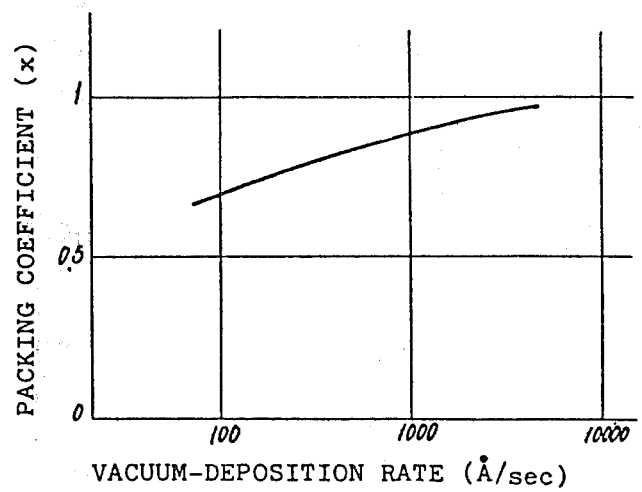
FIG. 8 is a graph showing the relationship between a vacuum-deposition rate of a Co-Cr magnetizable film of the vertical type and the packing coefficient x.

FIG. 8 is a graph showing the relationship between the rate of vacuum deposition of a Co-Cr magnetizable film of the vertical type and the packing coefficient. But the temperature of the substrate and a degree of vacuum is 30° C. and $4 \times 10^{-5}$ Torr, respectively. A Co-Cr ingot is heated by means of electron beams to evaporate. The packing coefficient becomes larger as the rate of vacuum deposition is increased.

Figure 9:
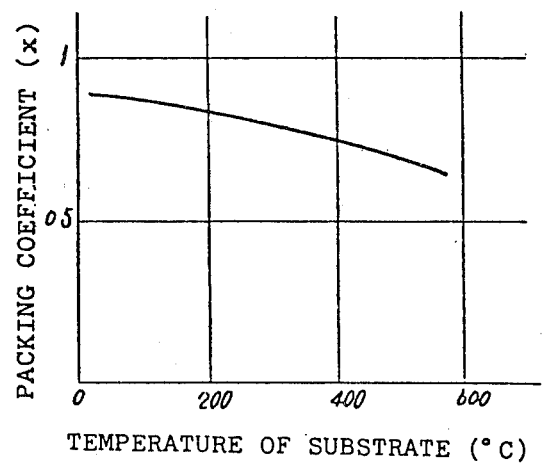
FIG. 9 is a graph showing the relationship between the temperature of a substrate during vacuum deposition of a Co-Cr magnetizable film of vertical type and a packing coefficient x.

FIG. 9 is a graph showing the relationship between the temperature of a substrate during vacuum deposition and the packing coefficient for a Co-Cr magnetizable film of the vertical type obtained by means of a vacuum deposition method. But a degree of vacuum and a rate of vacuum deposition during vacuum deposition is $4 \times 10^{-5}$ Torr and 1,000 Å/sec, respectively. A Co-Cr ingot was likewise heated by means of electron beams to evaporate. The packing coefficient is reduced as a temperature of a substrate is increased.

Figure 10:
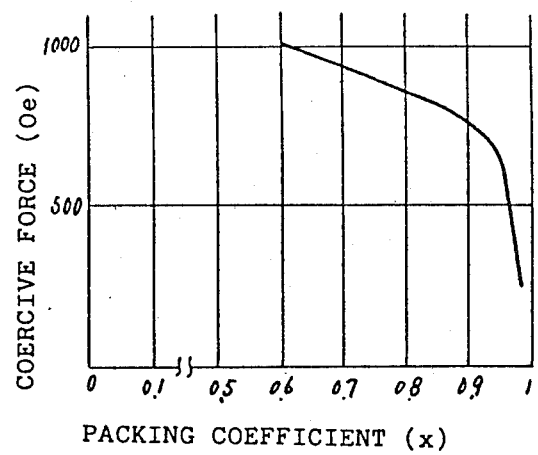
FIG. 10 is a graph showing the relationship between the packing coefficient x of a Co-Cr magnetizable film of the vertical type and a coercive force in the direction vertical to said film.

FIG. 10 is a graph showing the relationship between the packing coefficient and the coercive force vertical to a surface of a Co-Cr magnetizable film of vertical type obtained by means of a vacuum deposition method under a variety of manufacturing conditions. A magnetizable film of the vertical type having an improved short-wave recording characteristic can be obtained at a packing coefficient of 0.95 or less which has a coercive force of 600 Oe or more while the coercive force of said film is remarkably reduced at a packing coefficient of 0.95 or more and as a result, the electromagnetic conversion characteristic is deteriorated so that said film is not suitable as a recording medium of the vertical type. Further it was already confirmed from the present inventor's experiments that a Co-Cr magnetizable film having the Cr content of 13 to 28% by weight and a saturation magnetization larger than the bulk having the same composition shows a similar tendency as that of a Co-Cr magnetizable film of the vertical type having the Cr content of 20% by weight.

On the contrary, as to corrosion resistance, the sample is left for 6 months, that is to say, a period longer by 4 months than that shown in FIG. 7, in an atmosphere having a temperature of 60° C. and a humidity of 90% and then the surface state thereof was observed by means of a microscope. As a result, it was found that spotted rusts were generated at a packing coefficient x of 0.75 or less while rusts were hardly generated at a packing coefficient x of 0.75 or more. It is therefore, found that an improved magnetizable film of the vertical type can be obtained at a packing coefficient x of 0.75 to 0.95.

However, as to the properties of Cr containing said magnetic thin films, it is expected that an improved magnetic thin film can be obtained which has a higher corrosion resistance as the Cr content thereof is increased. But, as described above, it is required, in order to satisfy the requirements for a magnetic thin film for recording of the vertical type, that Cr be contained at least in the amount of 10 to 28% by weight based on the total of Co and Cr and the saturation magnetization of said thin film is larger than that of the bulk having the same composition. Thus the content of Cr can not be increased excessively. The inventor of the present invention discovered that an improved magnetic thin film for recording of the vertical type could be obtained by changing the ratio of Cr to Co suitably along the thickness of said film in which high corrosion resistance incidental to Cr was utilized still further in addition to being satisfied with the above described requirements. A magnetic thin film of this type can be provided for example by arranging two vacuum deposition sources, one of which is for depositing Cr and other is for depositing Co, parallel to the running direction of a non-magnetic substrate, arranging the former ahead of the running direction of said non-magnetic substrate while the latter is arranged in the rear of the running direction of said non-magnetic substrate. A magnetic thin film, in which the composition is changed along the thickness thereof, will be described below.

Figure 11:
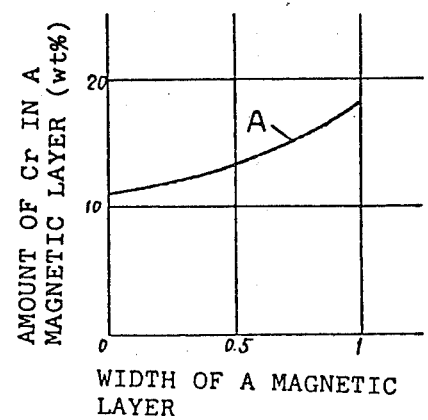
FIG. 11 is a diagram showing the distribution of Cr content along the width of a magnetic layer.

Referring now to the case in which the content of Cr, based on the total of Co and Cr, in a magnetic film containing Co and Cr as the main components thereof and formed on a non-magnetic substrate, is increased more and more toward the surface thereof (excluding the most superficial layer of several 10 Å and the boundary layer between said non-magnetic substrate and said magnetic layer of several 10 Å because they are unstable), it is possible to impart improved recording and playback efficiency in comparison to a magnetic thin film containing Cr in a higher amount throughout to said magnetic thin film, in which the content of Cr is increased toward the surface thereof, because the content of Cr is reduced more and more as the distance from the surface thereof is increased. That is to say, a magnetic layer having the above described construction shows corrosion resistance of the same degree as that of the superficial region of several 100 Å thick. A magnetic layer of this type shows corrosion resistance of the same degree as that of the superficial layer thereof on the whole if an improved corrosion resistance is shown in the superficial layer of several 100 Å thick, even though a somewhat deteriorated corrosion resistance is shown in the deeper region. A magnetic layer of the above described construction shows almost the same recording and playback efficiency as that of a magnetic layer having the same saturation magnetization as an average value of that for said magnetic layer of the above described construction. As shown for example by the curve 11 in FIG. 11, referring now to a Co-Cr magnetizable film of the vertical type in which the content of Cr is 11% by weight in the boundary layer between said non-magnetic substrate and said magnetic layer, the content of Cr being increased toward the surface thereof, and the content of Cr being 18% by weight in the superficial layer thereof, said Co-Cr magnetizable film of the vertical type can be sufficiently utilized as a magnetic recording medium under natural circumstances (not oxidized in the usual operation) and shows a recording and playback efficiency of the same degree as that of a Co-Cr magnetizable film of vertical type containing Cr at the rate of 14% by weight all over thereof (it goes without saying that the latter magnetizable film is somewhat inferior to the former in corrosion resistance).

As clearly understood from the above description, the main point of the present invention is in that a thin film, in which the content of Cr is 13 to 28% by weight based on a total of Co and Cr a saturation magnetization being larger than that of the bulk having the same composition, packing coefficient being within the limits of 0.75 to 0.95, and improved magnetic characteristics and corrosion resistance being given by the means such as increasing the content of Cr toward the surface thereof and the like, is used as a magnetic thin film for a magnetic recording medium. The magnetic recording medium according to the present invention will do much to satisfy the requirement for a high-density record in the field of magnetic recording and thus it is of industrial value.

What we claim is:

1. A magnetic recording medium comprising a magnetic layer containing Co and Cr as the main components thereof, formed on a substrate by vacuum deposition, the magnetic layer having an axis of easy magnetization perpendicular to the surface of the medium, wherein said magnetic layer contains Cr in an amount of 13 to 28% by weight based on the total of Co and Cr and has a saturation magnetization larger than that of the bulk having the same composition as the average composition thereof and wherein a packing coefficient x, defined by the quotient obtained by dividing the density of said magnetic film (g/cm$^3$) by the density of a single crystal having the same composition as that of said magnetic film (g/cm$^3$) is between 0.75 and 0.95.

2. The magnetic recording medium set forth in claim 1, wherein the ratio of Co and Cr is changed along the thickness of said magnetic layer.

3. The magnetic recording medium set forth in claim 2, wherein the content of Cr is increased toward the surface of said magnetic layer.

* * * * *